United States Patent
Cmielowski et al.

(10) Patent No.: US 11,501,239 B2
(45) Date of Patent: Nov. 15, 2022

(54) METRIC SPECIFIC MACHINE LEARNING MODEL IMPROVEMENT THROUGH METRIC SPECIFIC OUTLIER REMOVAL

(71) Applicant: International Business Machines Corporation, Armonk, NY (US)

(72) Inventors: Lukasz G. Cmielowski, Cracow (PL); Wojciech Sobala, Cracow (PL); Maksymilian Erazmus, Zasów (PL); Rafal Bigaj, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 16/822,081

(22) Filed: Mar. 18, 2020

(65) Prior Publication Data

US 2021/0295231 A1    Sep. 23, 2021

(51) Int. Cl.
  *G06Q 10/06*  (2012.01)
  *G06N 20/00*  (2019.01)

(52) U.S. Cl.
  CPC ....... *G06Q 10/06393* (2013.01); *G06N 20/00* (2019.01); *G06Q 10/0637* (2013.01)

(58) Field of Classification Search
  CPC .......... G06N 20/00; G06N 3/08; G06N 20/20; G06N 3/02; G06Q 10/0637; G06Q 10/0635
  See application file for complete search history.

(56) References Cited

U.S. PATENT DOCUMENTS

| | | | | |
|---|---|---|---|---|
| 6,067,535 | A | * | 5/2000 | Hobson ............... G06N 3/02 706/10 |
| 6,920,440 | B1 | * | 7/2005 | Barson .............. H04M 3/533 706/21 |
| 7,627,620 | B2 | * | 12/2009 | Campos ............. G06F 16/2465 |
| 10,331,437 | B2 | * | 6/2019 | Boss .................. G06Q 50/01 |
| 10,467,550 | B1 | * | 11/2019 | Gupta ................ G06N 20/00 |
| 10,614,056 | B2 | * | 4/2020 | Ignatyev ............. G06N 5/003 |
| 10,789,548 | B1 | * | 9/2020 | Yeganeh ........... G06Q 30/0631 |
| 11,030,492 | B2 | * | 6/2021 | Zeiler ................ G06K 9/6277 |
| 11,232,009 | B2 | * | 1/2022 | Vijendra ............. G06F 11/302 |
| 11,392,969 | B2 | * | 7/2022 | Pandey .............. G06N 3/0445 |
| 2003/0014377 | A1 | * | 1/2003 | Barson .............. H04M 15/00 706/20 |

(Continued)

OTHER PUBLICATIONS

Brownlee, Jason, How to Remove Outliers from Machine Learning MachineLearningMastery.com, Apr. 25, 2018 (Year: 2018).*

(Continued)

*Primary Examiner* — Scott L Jarrett
(74) *Attorney, Agent, or Firm* — Donald J. O'Brien (57) ABSTRACT

Embodiments are disclosed for a method for machine learning model training outliers. The method includes determining multiple metric values for corresponding transactions generated by a machine learning model. The method also includes deleting multiple preliminary outliers from the transactions based on a derived cut-off value. Further, the method includes identifying an absolute goal for improving a metric of the machine learning model. Additionally, the method includes identifying multiple training outliers from the remaining transactions. The remaining transactions include the transactions remaining after deleting the preliminary outliers. Also, a metric value of the remaining transactions meets the absolute goal.

18 Claims, 8 Drawing Sheets

(56) References Cited

U.S. PATENT DOCUMENTS

| | | | | |
|---|---|---|---|---|
| 2008/0288427 | A1* | 11/2008 | Barson | H04M 15/00 |
| | | | | 706/25 |
| 2015/0213389 | A1 | 7/2015 | Modarresi | |
| 2016/0162917 | A1 | 6/2016 | Singh et al. | |
| 2017/0228659 | A1* | 8/2017 | Lin | G06N 3/08 |
| 2017/0353991 | A1* | 12/2017 | Tapia | H04W 24/04 |
| 2019/0012167 | A1* | 1/2019 | Boss | G06F 8/70 |
| 2019/0102700 | A1* | 4/2019 | Babu | G06N 5/025 |
| 2019/0236497 | A1 | 8/2019 | Santos et al. | |
| 2019/0339416 | A1* | 11/2019 | Elkabetz | G01W 1/10 |
| 2020/0012962 | A1* | 1/2020 | Dent | G06F 9/5011 |
| 2020/0167659 | A1* | 5/2020 | Moon | G06N 5/043 |
| 2020/0349434 | A1* | 11/2020 | Zhang | G06N 20/10 |
| 2020/0356458 | A1* | 11/2020 | Rosa | G06F 11/3442 |
| 2020/0364561 | A1* | 11/2020 | Ananthanarayanan | |
| | | | | H04L 41/142 |
| 2021/0042570 | A1* | 2/2021 | Iskandar | G06F 11/3089 |
| 2021/0064700 | A1* | 3/2021 | Gopalan | G06N 3/084 |
| 2021/0065042 | A1* | 3/2021 | Gopalan | G06F 40/30 |
| 2021/0065053 | A1* | 3/2021 | Higgins | G06N 20/20 |
| 2021/0103580 | A1* | 4/2021 | Schierz | G06F 16/2365 |
| 2021/0110313 | A1* | 4/2021 | Jones | G06N 3/08 |
| 2021/0158148 | A1* | 5/2021 | Coover | G06N 3/08 |
| 2021/0158183 | A1* | 5/2021 | Lohia | G06N 5/04 |
| 2021/0256310 | A1* | 8/2021 | Roberts | G06K 9/6257 |
| 2021/0256420 | A1* | 8/2021 | Elisha | G06N 5/04 |
| 2021/0286780 | A1* | 9/2021 | Harale | G06N 20/00 |

OTHER PUBLICATIONS

Swaling, Alvira, How to Make Your Machine Learning Models Robust to Outliers Heartbeat.Fritz.ai, May 31, 2018 (Year: 2018).*

Li, Weizhi et al., Outlier detection and removal improves accuracy of machine learning approach to multispectral burn diagnostic imaging, Journal of Biomedical Optics, vol. 20, No. 12, Dec. 2015 (Year: 2015).*

Sani, Amir, Machine Learning for Decision Makers Universite de Lille, Jan. 14, 2016 (Year: 2016).*

Schrage, Michael et al., Improving Strategic Execution with Machine Learning MIT Sloan Management Review, Aug. 21, 2018 (Year: 2018).*

Chang, P.F., "KPI Analysis Using Temporal Causal Modeling in IBM SPSS Statistics—Part 1", Nov. 6, 2018, 15 pages.

Ray, S., "A Comprehensive Guide to Data Exploration", Jan. 10, 2016, 53 pages.

Mell et al., "The NIST Definition of Cloud Computing", Recommendations of the National Institute of Standards and Technology, Sep. 2011, 7 pages.

\* cited by examiner

METRIC SPECIFIC MACHINE LEARNING MODEL IMPROVEMENT THROUGH METRIC SPECIFIC OUTLIER REMOVAL

BACKGROUND

The present disclosure relates to machine learning models, and more specifically, to machine learning model outliers.

In some scenarios, a deployed, production-level, machine learning model can experience a drop in accuracy over time. While it may be possible to counter the drop and improve model accuracy, re-training the model with new training data to achieve these goals can be challenging.

SUMMARY

Embodiments are disclosed for a method for machine learning model training outliers. The method includes determining multiple metric values for corresponding transactions generated by a machine learning model. The method also includes deleting multiple preliminary outliers from the transactions based on a derived cut-off value. Further, the method includes identifying an absolute goal for improving a metric of the machine learning model. Additionally, the method includes identifying multiple training outliers from the remaining transactions. The remaining transactions include the transactions remaining after deleting the preliminary outliers. Also, a metric value of the remaining transactions meets the absolute goal.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

A machine learning model (hereinafter, "model") can be a computer software and/or hardware architecture that makes specific classifications based on a training process wherein the model learns to make these classifications. For example, a model can learn to recommend product purchases to a customer shopping at an online store. In addition to relatively complex classifications such as a product recommendation, models can also make binary (e.g., yes or no) decisions.

Current systems can provide tools to identify different types of drops in the accuracy of a machine learning model. Example metrics for representing the accuracy can include drift, confidence, and uncertainty. Drift can refer to a scenario where the model may develop a growing bias in favor or disfavor of certain classifications. Confidence can represent a measure of certainty, as opposed to the measure of uncertainty about classifications. While it may be useful to identify drift, and changes in confidence and uncertainty, it may be challenging to identify the training data to make, mitigate, and/or reverse these potential issues.

Machine learning models learn to make their specific classifications by analyzing labeled training data. The labeled training data can include data relevant to a classification, and the correct classification (label).

Accordingly, in some embodiments of the present disclosure, a model manager can identify transactions of a machine learning model that may be influencing a metric of the model. Each of the transactions can represent a classification that the model makes, along with the relevant data for the classification selection. Further, the model manager can re-label the transactions with an accurate classification. Accordingly, the model manager can use the re-labeled transactions as training data to retrain the model to correct the metric.

Figure 1:
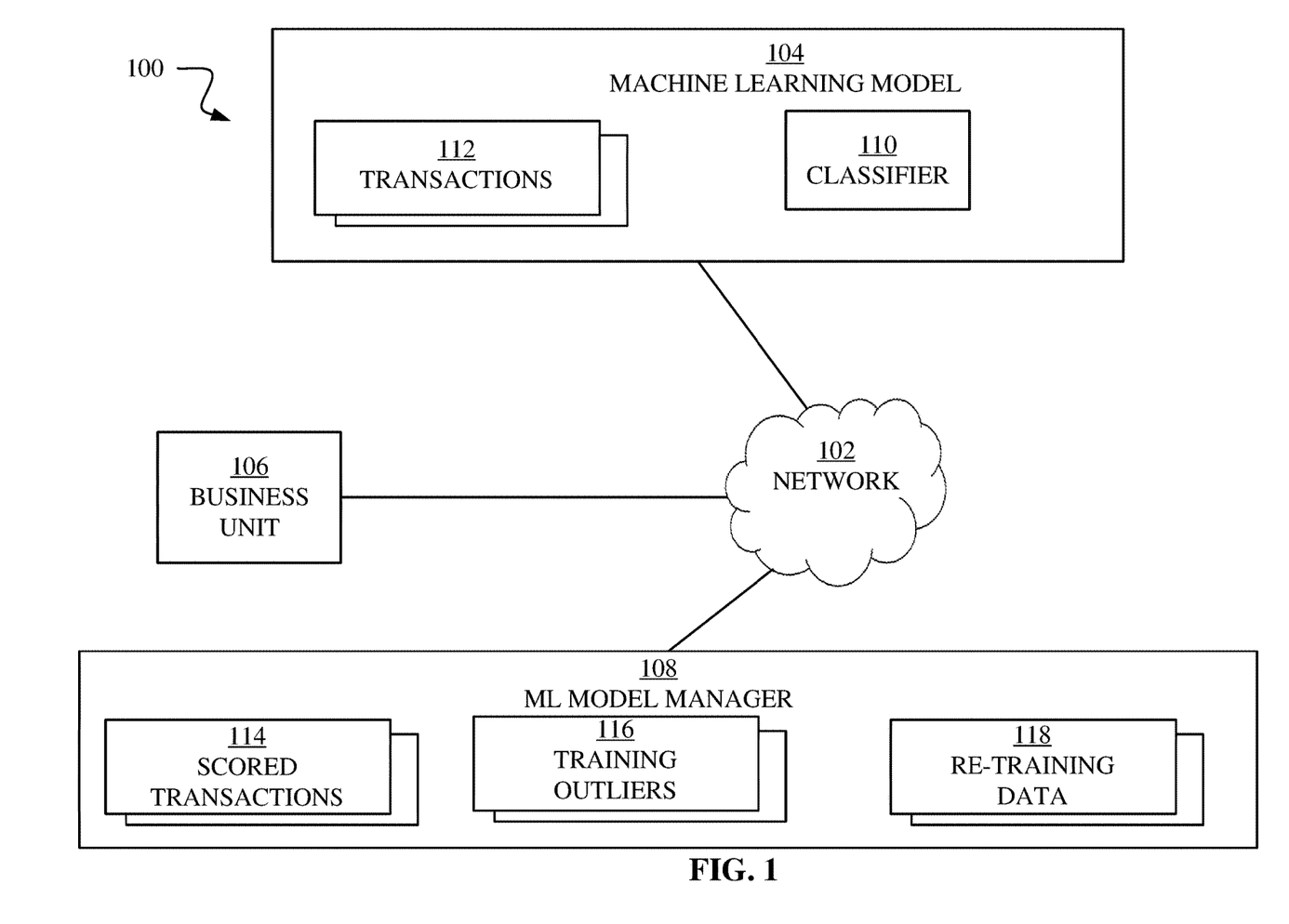
FIG. 1 is a block diagram of an example system for machine learning model training outliers, in accordance with some embodiments of the present disclosure.

FIG. 1 is a block diagram of a system 100 for identifying training outliers in a machine learning model, in accordance with some embodiments of the present disclosure. The system 100 includes a network 102, machine learning model 104, business unit 106, and machine learning (ML) model manager 108. The network 102 can be a network or collection of networks, such as local area networks and/or wide area network. In some embodiments, the network 102 can be the Internet.

The machine learning model 104 can include a classifier 110 and transactions 112. The classifier 110 can select the classification for each of multiple input transactions and update the transactions 112 to include the selected classification. For example, an input transaction for a loan approval request can include information relevant to the machine learning model 104 to decide whether to approve the loan request. Thus, the input transaction can include information such as, assets, income, and the like. The classifier 110 can decide whether to approve the loan request and update the corresponding transaction 112 to include the decision (i.e., classification).

The business unit 106 can represent a computer hardware and/or software architecture that make requests of the machine learning model 104 relevant to business decisions, such as loan approvals. The business unit 106 can collect customer information relevant to business decisions and provide the collected information to the machine learning model 104. Accordingly, the machine learning model 104 can make the business decision.

Because the business unit 106 can rely on the machine learning model 104 to make business decisions, the performance of the machine learning model 104 can have an impact on the success of the business. For example, if the machine learning model 104 begins to drift, the classifier 110 may begin to decline loan approval requests for customers that would otherwise be a relatively low risk for a loan. In such a scenario, the business unit 106 can lose out on opportunity to earn interest from a customer.

According to some embodiments of the present disclosure, the machine learning (ML) model manager 108 can identify a specific metric goal for improving the performance of the machine learning model 104. For example, the model manager 108 can provide an interface wherein a user can request a predetermined metric improvement, e.g., a ten percent improvement in confidence for the machine learning model 104. Confidence, uncertainty, and positive class probability are non-exclusive examples of metrics that are based on the accuracy of predictions and/or the probability of accurate predictions. Accordingly, the ML model manager 108 can generate scored transactions 114, identify training outliers 116 of the scored transactions 114, and generate re-training data 118. The re-training data 118 can be useful for re-training the machine learning model 104 to improve the metric by the requested amount.

Scoring the transactions 112 can involve determining a metric, such as the confidence and/or uncertainty for each of the transactions 112. These and/or other metrics can describe how well the classifier 110 of the machine learning model 104 is performing its classifications. The training outliers 116 can represent a subset of the scored transactions 114 that impact the specific metric goal. In other words, by removing the training outliers 116 from the scored transactions 114, the metric value can achieve the requested goal. In an example set of scored transactions, the ML model manager 108 can determine that removing a specific set of scored transactions with comparatively lower confidence values can improve the mean confidence of the remaining scored transactions by a predetermined amount.

Further, a client may generate re-training data 118 by re-labeling the training outliers 116. Alternatively, the ML model manager 108 can provide an interface (not shown) to re-label the training outliers 116. Re-labeling the training outliers 116 can involve selecting a new classification for the training outlier 116. Accordingly, the machine learning model 104 can retrain the classifier 110 with the re-labeled transactions in the re-training data 118. In this way, the classifier 110 can learn to make different classifications on the training outliers 116, thus correcting the confidence, for example, in the machine learning model 104. According to some embodiments of the present disclosure, confidence is merely one potential metric goal. Other metric goals may include uncertainty, drift, fairness, and the like.

The performance of business units, such as the business unit 106, can be represented in key performance indicators (KPIS). KPIS can vary from business to business but can generally represent statistics around business goals. For example, a loan business can use the number of accepted loan applications as a KPI. In some embodiments, the business unit 106 can include an analytics system (not shown). The analytics system can mine data collected by the business unit and try to find relationships between the performance of the business, i.e., KPIS, and the performance of the machine learning model 104. In some embodiments, the analytics system can also determine the amount of correlation between KPIS and changes in the machine learning model 104.

Accordingly, some embodiments can improve KPIS by mitigating issues with various metrics of the machine learning model 104. More specifically, embodiments can identify the training outliers 116 that may be influencing the specific metric. Some embodiments may identify the training outliers 116 based on an estimate of the metric without the outlier transactions. In other words, the ML model manager 108 can determine how many outlier transactions to remove from all the transactions 112 to move the metric value back on track.

Figure 2:
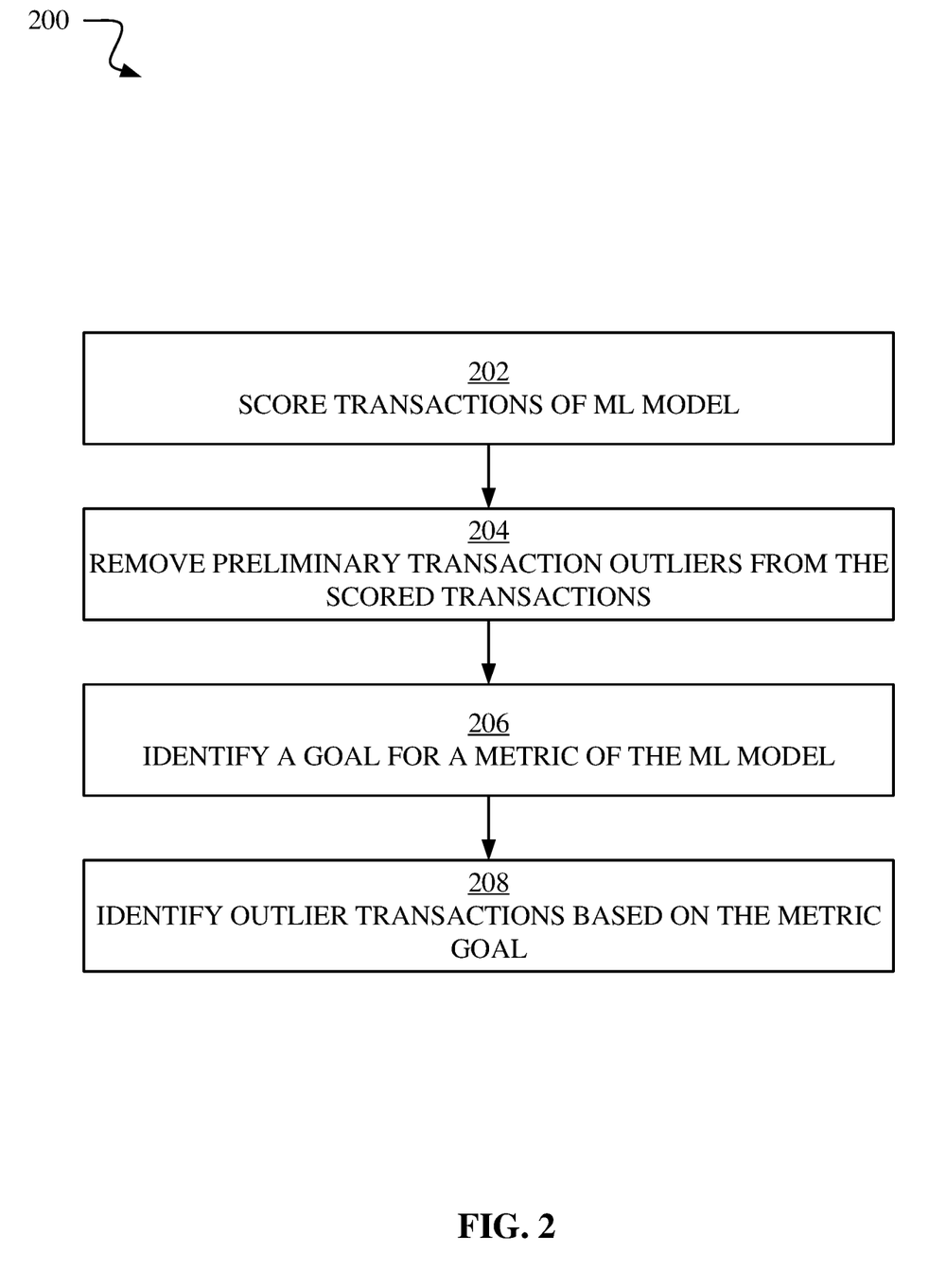
FIG. 2 is a process flow chart of a method for identifying outlier transactions in a machine learning model, in accordance with some embodiments of the present disclosure.

FIG. 2 is a process flow chart of a method 200 for identifying outlier transactions in a machine learning model, in accordance with some embodiments of the present disclosure. Additionally, the ML model manager 108 (described with respect to FIG. 1) may perform the method 200, according to some embodiments of the present disclosure.

At operation 202, the ML model manager 108 can score transactions of a machine learning (ML) model. In this way, the ML model manager 108 can generate scored transactions such as, the scored transactions 114 of the machine learning model 104. Scoring the transactions can involve determining confidence and/or uncertainty percentages of each of the transactions 112.

At operation 204, the machine learning model 104 can remove preliminary outlier transactions from the scored transactions 114. The ML model manager 108 can identify the preliminary outlier transactions based on a specified quantile quality criteria of the requested metric. Quantile quality criteria can include statistics such as mean, median, mode, quartile-percentages, standard mean, and the like. Thus, the ML model manager 108 can thus identify the preliminary outliers as the scored transactions at or below the fifth quantile of confidence, for example.

At operation 206, the ML model manager 108 can identify a goal for a metric of the machine learning model 104. In some embodiments, the ML model manager 108 can provide a user interface that enables specifying a metric goal for the machine learning model 104. The metric goal can be a predetermined threshold. For example, the metric goal can be a threshold confidence level of ninety percent (90%).

At operation 208, the ML model manager 108 can identify outlier transactions such as, the training outliers 116, for re-training based on the metric goal. For example, if the metric goal is a predetermined threshold of 90% confidence, the ML model manager 108 can identify the training outliers 116 as those scored transactions with a confidence level below 90%. Thus, the ML model manager 108 can achieve the predetermined metric goal by removing the training outliers 116 and the preliminary outliers from the scored transactions 114.

The metric goal may alternatively be a relative improvement in a metric. For example, the metric goal can be a 10% increase in confidence. Thus, removing the training outliers 116 from the scored transactions 114 can improve the confidence of the remaining transactions by 10%.

In some embodiments, the metric goal can be based on a standard unit value. The standard unit value can represent a correlation between a KPI and a metric. Thus, the standard unit value can describe by how much of a change in a specific metric correlates to a specific change in a KPI. In the example loan business model, accepted loan applications can represent a KPI. Further, a standard unit value can indicate that a drop of 0.69% in accuracy correlates to a 20.95% drop in accepted loan applications. As such, the metric goal can be represented relative to the standard unit. Thus, the metric goal for this example can be a 0.69% improvement in accuracy.

Figure 3:
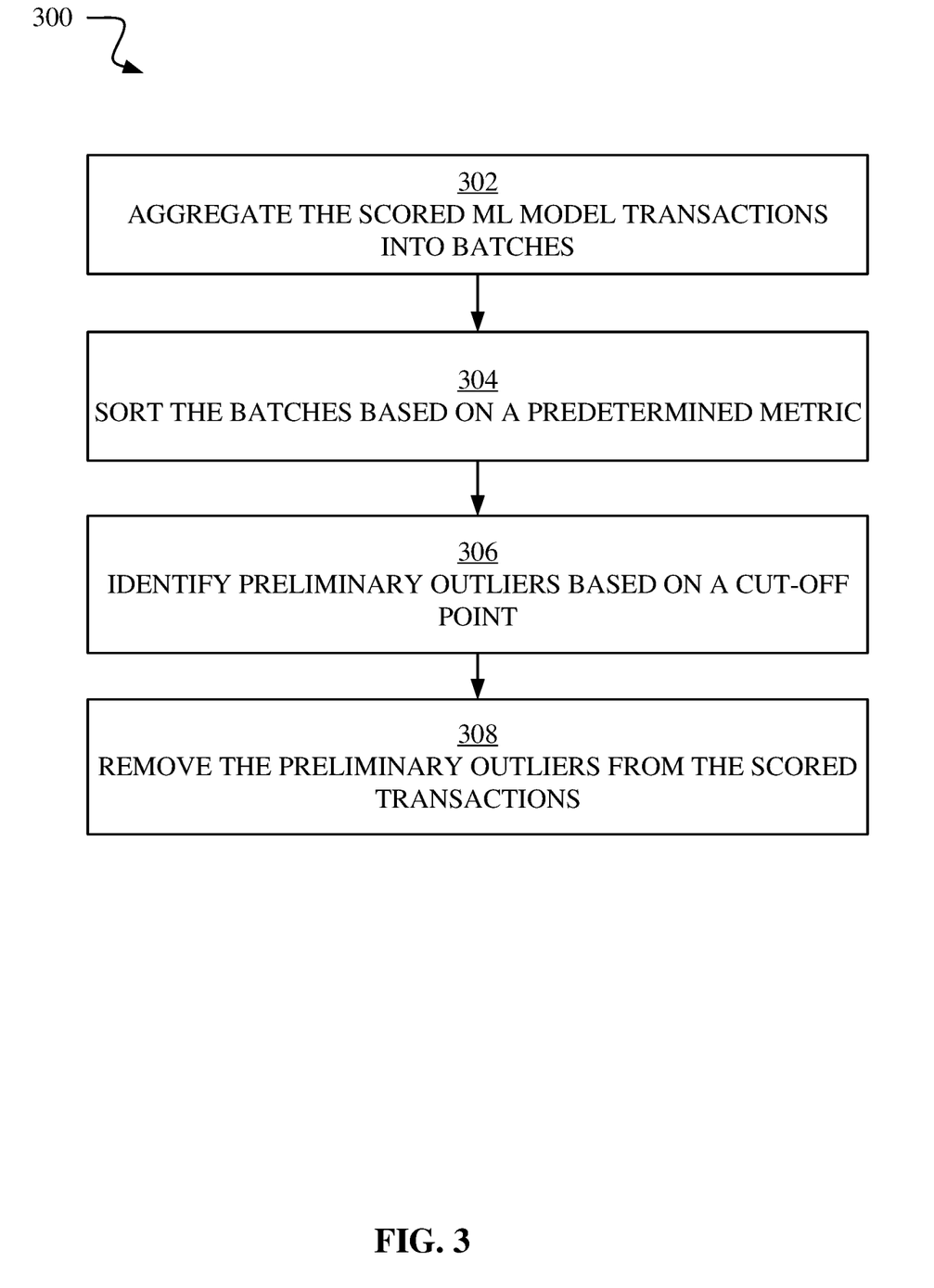
FIG. 3 is a process flow chart of a method for identifying preliminary outliers of a machine learning model, in accordance with some embodiments of the present disclosure.

FIG. 3 is a process flow chart of a method 300 for identifying preliminary outliers of a machine learning model, in accordance with some embodiments of the present disclosure. Additionally, the ML model manager 108 may perform the method 300, according to some embodiments of the present disclosure.

At operation 302, the ML model manager 108 can aggregate the scored transactions 114 into batches. Aggregating the scored transactions 114 into batches can involve grouping a specific number of scored transactions based on predetermined criteria such as, a timestamp. Thus, the ML model manager 108 can aggregate the scored transactions into batches of one thousand (1,000) based on the timestamps, for example. In this way, the previous 1,000 transactions can represent a first batch; the 1,000 transactions prior to the first batch can represent a second batch, and so on.

In some embodiments, aggregation techniques can include mean values, quartile values, interquartile range values, trimean values, and the like. For example, BATCH DESCRIPTION TABLE 1 describes example batches with respect to mean metric values:

| BATCH DESCRIPTION TABLE 1 | | | |
| --- | --- | --- | --- |
| BATCH ID | POS CLASS PROB | CONFIDENCE | UNCERTAINTY |
| 0 | 0.079612 | 0.920388 | 0.159225 |
| 1 | 0.237598 | 0.762402 | 0.475197 |
| 2 | 0.213036 | 0.786964 | 0.426072 |
| 3 | 0.386895 | 0.613105 | 0.773790 |
| 4 | 0.871494 | 0.871494 | 0.257011 |

At operation 304, the ML model manager 108 can sort the individual batches based on a predetermined metric. The predetermined metric can be related to the metric goal. For example, if the metric goal is a 10% increase in confidence, the predetermined metric can be the confidence.

At operation 306, the ML model manager 108 can identify the preliminary outliers based on a cut-off point. The cut-off point can represent a specific percentage threshold that is based on a quantile quality metric. For example, the ML model manager 108 can calculate a cut-off point at the $5^{th}$ quantile of the mean confidence of all the batches. In this way, the ML model manager 108 identifies the preliminary outliers as all scored transactions with metric values at or below the cut-off point. In the above example, the preliminary outliers may be scored transactions with a confidence level at or below the $5^{th}$ quantile. The quantile quality metric may apply to individual batches, or across all the aggregated batches.

At operation 308, the ML model manager 108 can remove the preliminary outliers from the batches. Thus, in the above example, the ML model manager 108 can filter out of the batches all the scored transactions with metric values at or below the cut-off point. In this way, the remaining transactions can represent an improvement in the direction of the metric goal. Further, filtering outliers can be applied to individual batches as well as to a range of batches.

Figure 4:
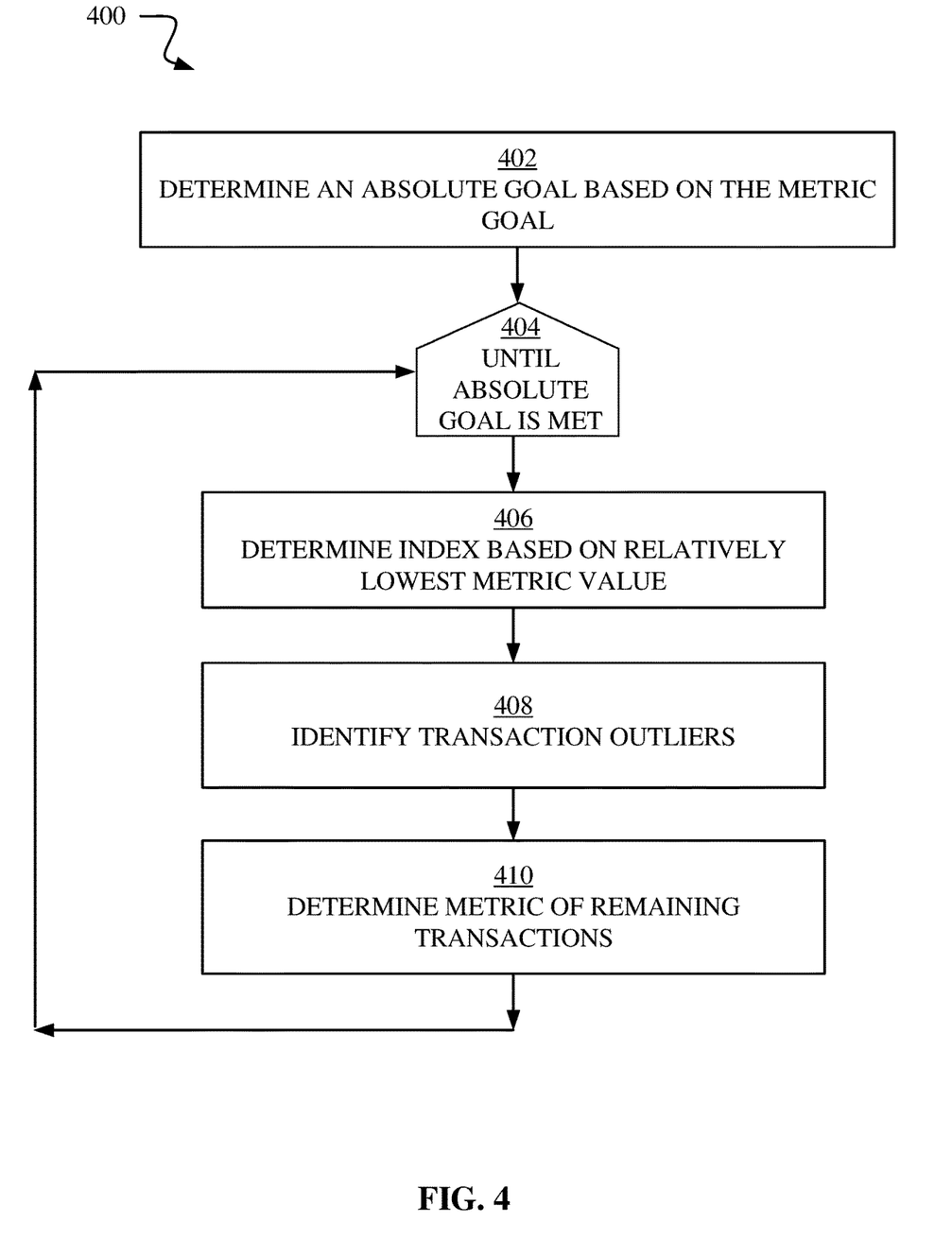
FIG. 4 is a process flow chart of a method for identifying training outliers of a machine learning model, in accordance with some embodiments of the present disclosure.

FIG. 4 is a process flow chart of a method 400 for identifying training outliers of a machine learning model, in accordance with some embodiments of the present disclosure. Additionally, the ML model manager 108 may perform the method 400 to generate the training outliers 116 described with respect to FIG. 1.

Referring back to FIG. 4, at operation 402, the ML model manager 108 can determine an absolute goal based on the metric goal. If the metric goal is already specified as an absolute goal, the ML model manager 108 does not modify the absolute goal. However, if the metric goal is a relative goal such as, a 10% improvement in confidence, the ML model manager 108 can determine the absolute goal based on EQUATION 1:

$$ABSOLUTE\_GOAL=(1+RELATIVE\_VALUE)*CONFIDENCE.MEAN(\ ) \quad \text{EQUATION 1}$$

It is noted that confidence is merely one example metric that may be used for the absolute goal calculation. Other metrics are possible depending on the specific metric goal. The ML model manager 108 can repeatedly perform operations 404 through 410 to identify training outliers 116. In each iteration, the ML model manager 108 can remove the training outliers 116 from the batches and determine if their removal has improved the metric goal value enough to meet the absolute goal. If not, the ML model manager 108 can perform operations 404 through 410 until the absolute goal is met.

At operation 406, the ML model manager 108 can determine an index value based on the relatively lowest metric values of the transactions remaining after removing the preliminary outliers. Thus, the index value in a first iteration of operations 404 through 410 can represent a confidence value equal to the cut-off point of the preliminary outliers.

At operation 408, the ML model manager 108 can remove scored transactions from the batches based on the index value. Removing the scored transactions at or below the index value can improve the relevant metric value of the metric goal.

At operation 410, the ML model manager 108 can determine the metric values of one or more batches based on the remaining scored transactions. If the metric values do not meet the absolute goal, the ML model manager 108 can repeat operations 404 through 410 for a new index value. The new index value may be based on the lowest metric values of the remaining scored transactions.

Figure 5:
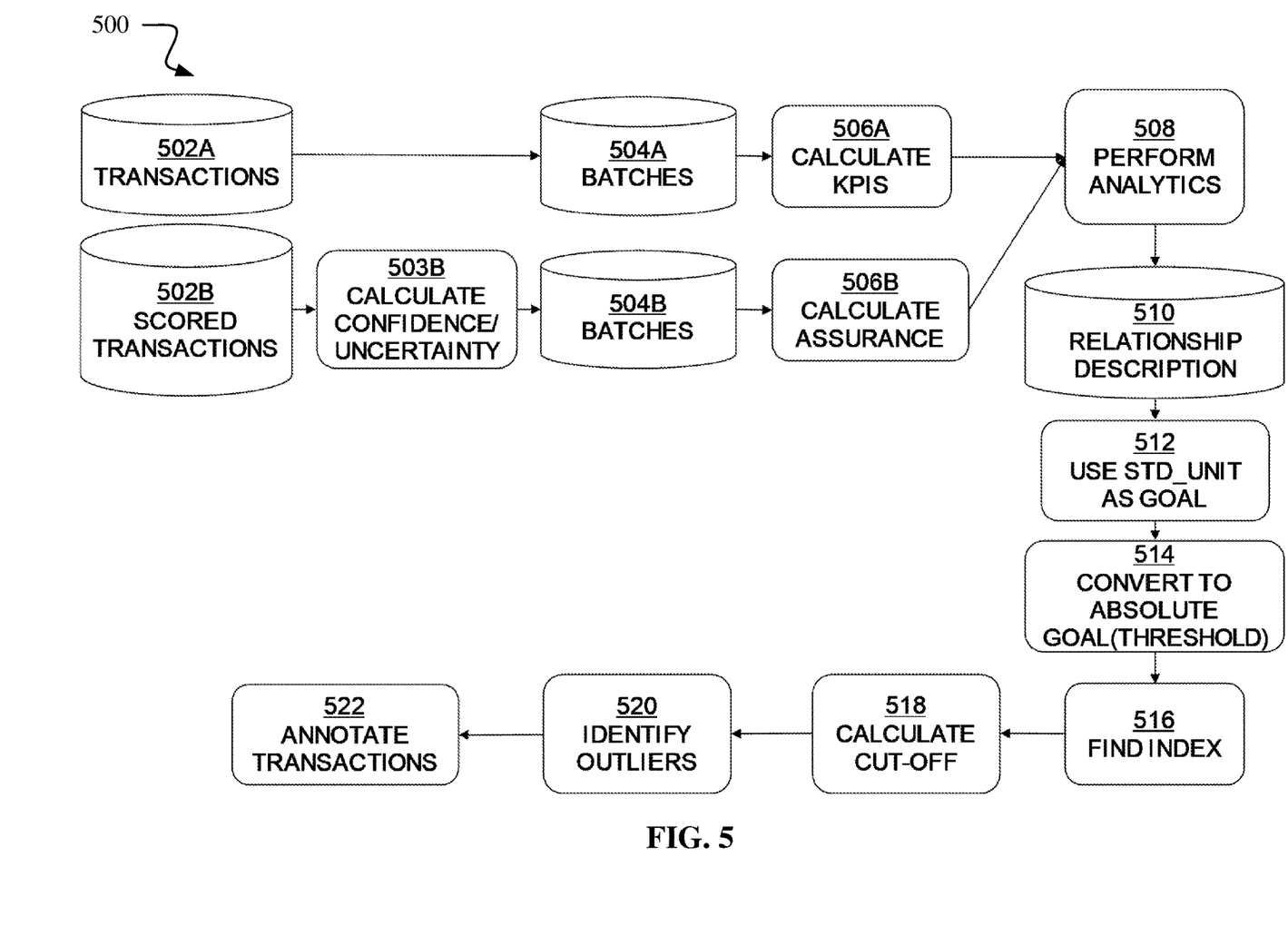
FIG. 5 is a process flow chart of a method for identifying training outliers of a machine learning model, in accordance with some embodiments of the present disclosure.

FIG. 5 is a process flow chart of a method 500 for identifying training outliers of a machine learning model, in accordance with some embodiments of the present disclosure. Additionally, the ML model manager 108 may perform the method 500 to generate the training outliers 116 described with respect to FIG. 1.

The transactions 502A can be similar to the transactions 112 described with respect to FIG. 1. The scored transactions 502B can be similar to the scored transactions 114. The calculate confidence/uncertainty 503B can be a process for determining the confidence and/or uncertainty for each of the scored transactions. The batches 504A, 504B can represent the aggregated batches of scored transactions described with respect to FIG. 3. The ML model manager 108 can generate the batches 504A, 504B by grouping specific numbers of transactions 502A and scored transactions 502B together based on criteria such as, a timestamp. The calculate KPIS 506A can be a process for determining KPIS. The calculate assurance 506B can be a process for determining the assurance metric for each of the scored transactions 502B. The perform analytics 508 can represent a process to determine correlations between the KPIS and the metrics of the model. The relationship description 510 can represent the output of the perform analytics 508 process. The use standard unit (STD_UNIT) as a goal 512 can represent a process for defining the standard unit value as a goal.

The convert to absolute goal (threshold) 514 can be similar to operation 402 described with respect to FIG. 4. After calculating the threshold, the ML model manager 108 can use the threshold to find an index based on the first non-compliant transaction in the sorted batch. The find index 516 can be similar to operation 406. The calculate cut-off 518 can represent a process similar to the process for calculating the cut-off point in operation 306 described with respect to FIG. 3. The identify outliers 520 can be similar to operation 408. The annotate transactions 522 can represent an operation to identify the outlier transactions.

Figure 6:
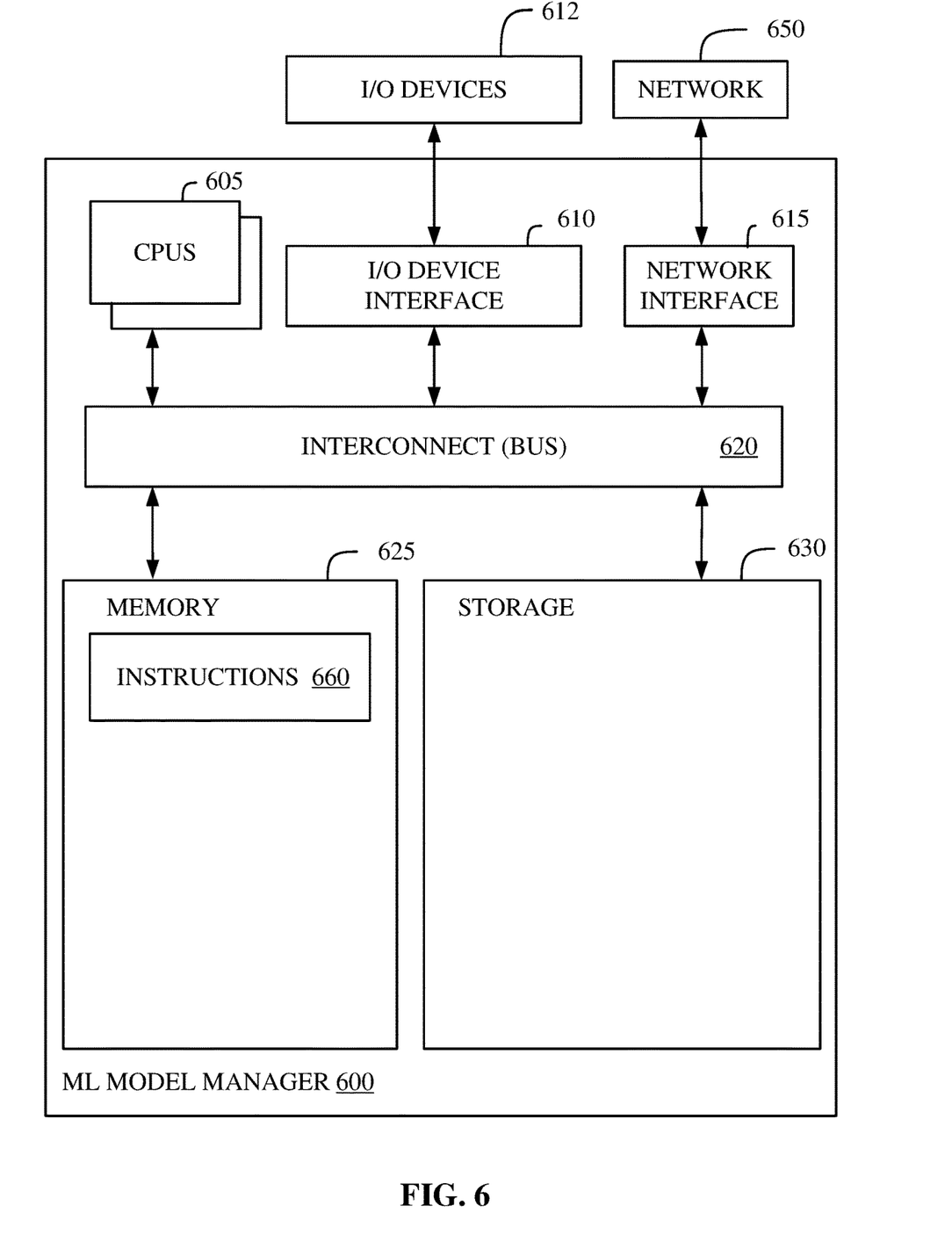
FIG. 6 is a block diagram of an example ML model manager, in accordance with some embodiments of the present disclosure.

FIG. 6 is a block diagram of an example ML model manager 600, in accordance with some embodiments of the present disclosure. In various embodiments, the ML model manager 600 is similar to the ML model manager 108 and can perform the methods described in FIGS. 2-5 and/or the functionality discussed in FIG. 1. In some embodiments, the ML model manager 600 provides instructions for the aforementioned methods and/or functionalities to a client machine such that the client machine executes the method, or a portion of the method, based on the instructions provided by the ML model manager 600. In some embodiments, the ML model manager 600 comprises software executing on hardware incorporated into a plurality of devices.

The ML model manager 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or the storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 6D integrated circuits (3DICs) (e.g., 6D wafer-level packaging (3DWLP), 6D interposer based integration, 6D stacked ICs (3D-SICs), monolithic 6D ICs, 6D heterogeneous integration, 6D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, and/or flash memory devices. Additionally, the storage 630 can include storage area-network (SAN) devices, the cloud, or other devices connected to the ML model manager 600 via the I/O device interface 610 or to a network 650 via the network interface 615.

In some embodiments, the memory 625 stores instructions 660. However, in various embodiments, the instructions 660 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all, any of the methods described in FIGS. 2-5 and/or the functionality discussed in FIG. 1.

In various embodiments, the I/O devices 612 include an interface capable of presenting information and receiving input. For example, I/O devices 612 can present information to a listener interacting with ML model manager 600 and receive input from the listener.

The ML model manager 600 is connected to the network 650 via the network interface 615. Network 650 can comprise a physical, wireless, cellular, or different network.

In some embodiments, the ML model manager 600 can be a multi-user mainframe computer system, a single-user system, or a server computer or similar device that has little or no direct user interface but receives requests from other computer systems (clients). Further, in some embodiments, the ML model manager 600 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary ML model manager 600. In some embodiments, however, individual components can have greater or lesser complexity than as represented in FIG. 6, components other than or in addition to those shown in FIG. 6 can be present, and the number, type, and configuration of such components can vary.

Although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third-party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third-party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
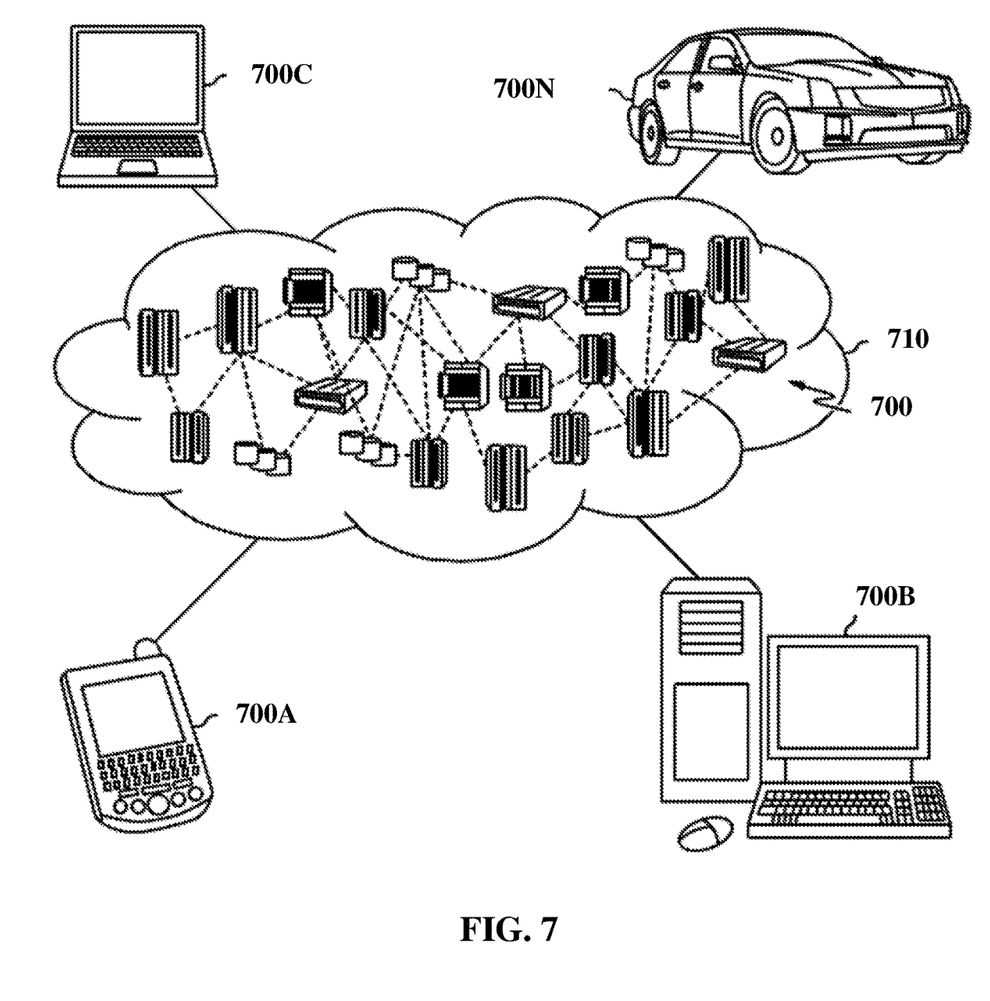
FIG. 7 is a cloud computing environment, according to some embodiments of the present disclosure.

FIG. 7 is a cloud computing environment 710, according to some embodiments of the present disclosure. As shown, cloud computing environment 710 includes one or more cloud computing nodes 700. The cloud computing nodes 700 can perform the methods described in FIGS. 2-5 and/or the functionality discussed in FIG. 1. Additionally, cloud computing nodes 700 can communicate with local computing devices used by cloud consumers, such as, for example, personal digital assistant (PDA) or cellular telephone 700A, desktop computer 700B, laptop computer 700C, and/or automobile computer system 700N. Further, the cloud computing nodes 700 can communicate with one another. The cloud computing nodes 700 can also be grouped (not shown) physically or virtually, in one or more networks, such as Private, Community, Public, or Hybrid clouds as described hereinabove, or a combination thereof. This allows cloud computing environment 710 to offer infrastructure, platforms and/or software as services for which a cloud consumer does not need to maintain resources on a local computing device. It is understood that the types of computing devices 700A-N shown in FIG. 7 are intended to be illustrative only and that computing nodes 700 and cloud computing environment 710 can communicate with any type of computerized device over any type of network and/or network addressable connection (e.g., using a web browser).

Figure 8:
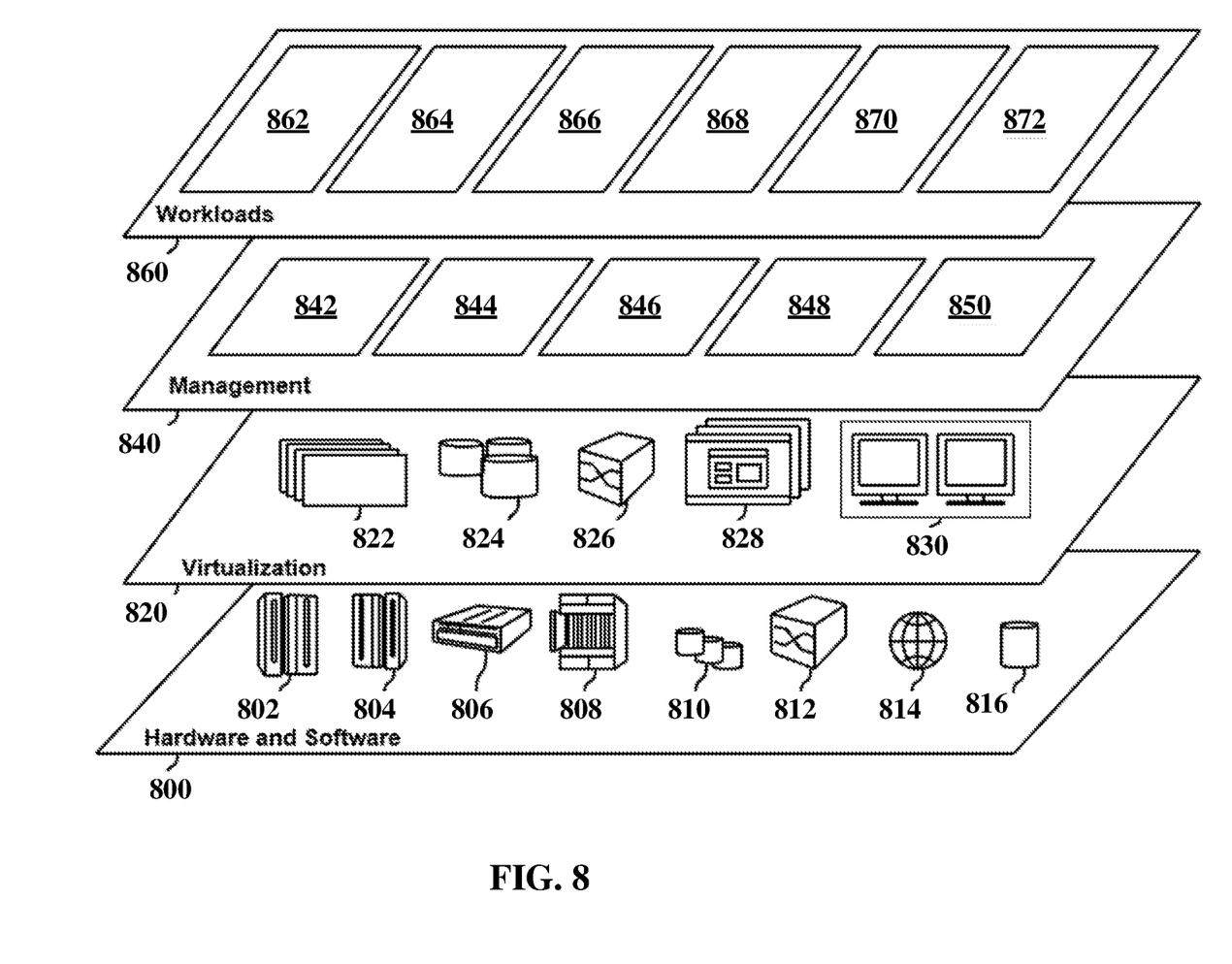
FIG. 8 is a set of functional abstraction model layers provided by cloud computing environment, according to some embodiments of the present disclosure, is shown.

FIG. 8 is a set of functional abstraction model layers provided by cloud computing environment 710 (FIG. 7), according to some embodiments of the present disclosure. It should be understood in advance that the components, layers, and functions shown in FIG. 8 are intended to be illustrative only and embodiments of the disclosure are not limited thereto. As depicted below, the following layers and corresponding functions are provided.

Hardware and software layer 800 includes hardware and software components. Examples of hardware components include: mainframes 802; RISC (Reduced Instruction Set Computer) architecture based servers 804; servers 806; blade servers 808; storage devices 810; and networks and networking components 812. In some embodiments, software components include network application server software 814 and database software 816.

Virtualization layer 820 provides an abstraction layer from which the following examples of virtual entities can be provided: virtual servers 822; virtual storage 824; virtual networks 826, including virtual private networks; virtual applications and operating systems 828; and virtual clients 830.

In one example, management layer 840 can provide the functions described below. Resource provisioning 842 provides dynamic procurement of computing resources and other resources that are utilized to perform tasks within the cloud computing environment. Metering and Pricing 844 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 846 provides access to the cloud computing environment for consumers and system administrators. Service level management 848 provides cloud computing resource allocation and management such that required service levels are met. Service level management 848 can allocate suitable processing power and memory to process static sensor data. Service Level Agreement (SLA) planning and fulfillment 850 provide pre-arrangement for, and procurement of, cloud computing resources for which a future requirement is anticipated in accordance with an SLA.

Workloads layer 860 provides examples of functionality for which the cloud computing environment can be utilized. Examples of workloads and functions which can be provided from this layer include: mapping and navigation 862; software development and lifecycle management 864; virtual classroom education delivery 866; data analytics processing 868; transaction processing 870; and ML model manager 872.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for machine learning model training outliers, comprising:
    providing a cloud service to update a machine learning model for a business unit such that a key performance indicator (KPI) of the business unit meets a predetermined KPI goal, by:
        determining a numerically quantified metric improvement goal based on a standard unit value that represents a correlation between the KPI and a metric of the machine learning model;
        generating a plurality of scored transactions comprising a determined metric value for each of a corresponding plurality of transactions generated for the machine learning model, wherein the determined metric value is associated with the numerically quantified metric improvement goal; identifying a plurality of preliminary outliers from the plurality of scored transactions based on a derived cut-off value for the determined metric value;
    deleting the plurality of preliminary outliers;
    identifying a plurality of training outliers from a plurality of remaining transactions, wherein the remaining transactions comprise the transactions remaining after deleting the preliminary outliers, and wherein training the machine learning model with the training outliers influences the numerically quantified metric improvement goal;
    generating re-training data by re-labeling the plurality of training outliers with a plurality of predetermined labels corresponding to the plurality of training outliers; and
    re-training a classifier of the machine learning model with the re-training data, wherein the re-trained classifier meets the numerically quantified metric improvement goal; and
    providing the updated machine learning model to meet the KPI.

2. The computer-implemented method of claim 1, further comprising calculating the numerically quantified metric improvement goal based on a relative goal.

3. The computer-implemented method of claim 2, wherein the numerically quantified metric improvement goal is equal to (1+rg) X mv, wherein rg represents a relative goal expressed as a digital value of a percentage, and wherein my represents a metric value.

4. The computer-implemented method of claim 2, wherein the relative goal comprises a relative KPI goal.

5. The computer-implement method of claim 1, wherein the derived cut-off value comprises a metric value of the transactions.

6. The computer-implemented method of claim 1, wherein the method further comprises deleting the preliminary outliers by:
    aggregating the transactions into batches of predetermined size based on a predetermined criteria;
    sorting the batches based on the determined metric value;
    calculating the cut-off value; and
    identifying the preliminary outliers based on the cut-off value.

7. The computer-implemented method of claim 1, wherein identifying the plurality of training outliers comprises repeating the following until a metric value of the remaining transactions meets the numerically quantified metric improvement goal:
    determining an index based on a relatively lowest metric value of the remaining transactions;
    identifying the plurality of training outliers based on the index; and
    removing the plurality of training outliers from the transactions.

8. A computer program product comprising program instructions stored on a computer readable storage medium, the program instructions executable by a processor to cause the processor to perform a method comprising:
    providing a cloud service to update a machine learning model for a business unit such that a key performance indicator (KPI) of the business unit meets a predetermined KPI goal, by:
        determining a numerically quantified metric improvement goal based on a standard unit value that represents a correlation between the KPI and a metric of the machine learning model;
        generating a plurality of scored transactions comprising a determined metric value for each of a corresponding plurality of transactions generated for the machine learning model, wherein the determined metric value is associated with the numerically quantified metric improvement goal; identifying a plurality of preliminary outliers from the plurality of scored transactions based on a derived cut-off value for the determined metric value;
    deleting the plurality of preliminary outliers;
    identifying a plurality of training outliers from a plurality of remaining transactions, wherein the remaining transactions comprise the transactions remaining after deleting the preliminary outliers, and wherein training the machine learning model with the training outliers influences the numerically quantified metric improvement goal;
    generating re-training data by re-labeling the plurality of training outliers with a plurality of predetermined labels corresponding to the plurality of training outliers; and
    re-training a classifier of the machine learning model with the re-training data, wherein the re-trained classifier meets the numerically quantified metric improvement goal; and
    providing the updated machine learning model to meet the KPI.

9. The computer program product of claim 8, the method further comprising calculating the numerically quantified metric improvement goal based on a relative goal.

10. The computer program product of claim 9, wherein the numerically quantified metric improvement goal is equal to (1+rg) X mv, wherein rg represents a relative goal expressed as a digital value of a percentage, and wherein my represents a metric value.

11. The computer program product of claim 9, wherein the relative goal comprises a relative KPI goal.

12. The computer program product of claim 8, wherein the derived cut-off value comprises a metric value of the transactions.

13. The computer program product of claim 8, wherein the method further comprises deleting the preliminary outliers by:
    aggregating the transactions into batches of predetermined size based on a predetermined criteria;
    sorting the batches based on the determined metric value;

calculating the cut-off value; and identifying the preliminary outliers based on the cut-off value.

14. The computer program product of claim 8, wherein identifying the plurality of training outliers comprises repeating the following until a metric value of the remaining transactions meets the numerically quantified metric improvement goal:

determining an index based on a relatively lowest metric value of the remaining transactions;

identifying the plurality of training outliers based on the index; and removing the plurality of training outliers from the transactions.

15. A system comprising:

a computer processing circuit; and a computer-readable storage medium storing instructions, which, when executed by the computer processing circuit, are configured to cause the computer processing circuit to perform a method comprising:

providing a cloud service to update a machine learning model for a business unit such that a key performance indicator (KPI) of the business unit meets a predetermined KPI goal, by:

determining a numerically quantified metric improvement goal based on a standard unit value that represents a correlation between the KPI and a metric of the machine learning model;

generating a plurality of scored transactions comprising a determined metric value for each of a corresponding plurality of transactions generated for the machine learning model, wherein the determined metric value is associated with the numerically quantified metric improvement goal; identifying a plurality of preliminary outliers from the plurality of scored transactions based on a derived cut-off value for the determined metric value;

deleting the plurality of preliminary outliers;

identifying a plurality of training outliers from a plurality of remaining transactions, wherein the remaining transactions comprise the transactions remaining after deleting the preliminary outliers, and wherein training the machine learning model with the training outliers influences the numerically quantified metric improvement goal;

generating re-training data by re-labeling the plurality of training outliers with a plurality of predetermined labels corresponding to the plurality of training outliers; and re-training a classifier of the machine learning model with the re-training data, wherein the re-trained classifier meets the numerically quantified metric improvement goal; and providing the updated machine learning model to meet the KPI.

16. The system of claim 15, the method further comprising calculating the numerically quantified metric improvement goal based on a relative goal, and wherein the numerically quantified metric improvement goal is equal to $(1+rg) \times mv$, wherein rg represents a relative goal expressed as a digital value of a percentage, and wherein my represents a metric value.

17. The system of claim 15, wherein the method further comprises deleting the preliminary outliers by:

aggregating the transactions into batches of predetermined size based on a predetermined criteria;

sorting the batches based on the determined metric value;

calculating the cut-off value; and identifying the preliminary outliers based on the cut-off value.

18. The system of claim 15, wherein identifying the plurality of training outliers comprises repeating the following until a metric value of the remaining transactions meets the numerically quantified metric improvement goal:

determining an index based on a relatively lowest metric value of the remaining transactions;

identifying the plurality of training outliers based on the index; and removing the plurality of training outliers from the transactions.

* * * * *